US006195765B1

(12) United States Patent
Kislanko et al.

(10) Patent No.: US 6,195,765 B1
(45) Date of Patent: Feb. 27, 2001

(54) SYSTEM AND METHOD FOR TESTING AN APPLICATION PROGRAM

(75) Inventors: J. Paul Kislanko, Plano; Brian J. Ferguson, Allen; J. Leslie Turriff, Prosper, all of TX (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/002,591

(22) Filed: Jan. 5, 1998

(51) Int. Cl.[7] ................................................ H02H 3/05
(52) U.S. Cl. ................... 714/38; 714/38; 714/32; 714/33; 714/36; 714/37; 714/39; 717/4; 717/10; 717/11; 707/1; 707/6; 707/7; 707/101; 707/203; 703/22; 395/705; 395/706; 395/704
(58) Field of Search .................... 714/38, 32, 33, 714/36, 37, 39; 717/4, 10, 11; 707/101, 1, 6, 7, 203; 395/705, 706, 704; 703/22

(56) References Cited

U.S. PATENT DOCUMENTS

| 4,696,003 | * | 9/1987 | Kerr et al. | 714/38 |
| 5,335,342 | * | 8/1994 | Pope et al. | 714/822 |
| 5,630,118 | * | 5/1997 | Shaughnessy | 707/1 |
| 5,651,111 | * | 7/1997 | McKeeman et al. | 714/38 |
| 5,673,387 | * | 9/1997 | Chen et al. | 714/38 |
| 5,701,408 | * | 12/1997 | Cornell et al. | 714/38 |
| 5,729,744 | * | 3/1998 | Gerken et al. | 714/38 |
| 5,758,156 | * | 5/1998 | Kano | 713/100 |
| 5,805,795 | * | 9/1998 | Whitten | 714/38 |
| 5,930,782 | * | 7/1999 | Shaughnessy | 707/1 |
| 5,974,569 | * | 10/1999 | Nickles | 714/38 |

OTHER PUBLICATIONS

Kehlenbeck, A., The Ultimate Test, Software magazine, Englewood, NJ, Oct. 1997, pp. 59–62.*
Caldwell, B., Partizio, A., Testing 2000, Informationweek, Manhasset, Sep. 15, 1997, pp. 42–56.*

* cited by examiner

*Primary Examiner*—Ayaz R. Sheikh
*Assistant Examiner*—Firmin Backer
(74) *Attorney, Agent, or Firm*—L. Joy Griebenow; Baker & Botts L.L.P.

(57) ABSTRACT

A system (8) for testing an application program (20) includes a normal operating environment (12) within which the application program (20) is intended to execute when not being tested. A shared database (18) stores the application program (20) and provides a plurality of users (16) with access to the application program (20). A testing service (10) coupled to the normal operating environment (12) and the shared database (18) supports a base copy (22) of the normal operating environment (12) that simulates and is coupled to the normal operating environment (12). The testing service (10) also supports a first modified version (24) of the normal operating environment (12) that is isolated from the normal operating environment (12) and differs from the base copy (22) with respect to a first testing variable. The testing service (10) executes the application program (20) within the first modified version (24) of the normal operating environment (12) to test the application program (20) in response to at least one of the users (16) selecting the first modified version (24).

20 Claims, 2 Drawing Sheets

SYSTEM AND METHOD FOR TESTING AN APPLICATION PROGRAM

TECHNICAL FIELD OF THE INVENTION

This invention relates in general to the field of computer systems and software, and more particularly to a system and method for testing an application program.

BACKGROUND OF THE INVENTION

Business and other application programs execute in a wide variety of operating environments. Before deploying an application program into the operating environment in which the application programs is intended to execute, it is often desirable to test the application program to determine its suitability for the operating environment and to discover any problems associated with the application program before any undesirable physical, economic, or other damage may occur. For example, it might be desirable to test an application program that acts upon or using dates expressed in a format having a two-digit calendar year, and for which conversion to a format having a four-digit year is performed, due to potential ambiguities associated with dates on and after Jan. 1, 2000 and potential problems that may arise because of these ambiguities.

As the number and complexity of application programs and operating environments continue to increase, along with the potential damage that defects and problems associated with application programs may cause in some circumstances, techniques for testing application programs have become increasingly important. A known technique for testing an application program includes generating a simulation of the operating environment in which the application program is intended to execute, executing the application program within the simulated operating environment, recording the testing results, and discarding the simulated operating environment. If the application program is to be tested within a different operating environment, a simulation of this different operating environment must be generated and the application program retested. Although such techniques may be acceptable in some circumstances, they are often inadequate in cases in which a large number of application programs are to be tested in a large number of operating environments, due to the time and costs associated with generating the simulated operating environments. Moreover, multiple users are often unable to concurrently access a particular simulated operating environment, resulting in additional delays and costs. These and other disadvantages make previous techniques for testing application programs inadequate for many purposes.

SUMMARY OF THE INVENTION

According to the present invention, disadvantages and problems associated with testing application programs have been substantially reduced or eliminated.

According to one embodiment of the present invention, a system for testing an application program includes a normal operating environment for the application program within which the application program is intended to execute when not being tested. A shared database stores the application program and provides a plurality of users with access to the application program. A testing service coupled to the normal operating environment and the shared database supports a base copy of the normal operating environment that simulates the normal operating environment and is coupled to the normal operating environment. The testing service also supports a first modified version of the normal operating environment that is isolated from the normal operating environment and differs from the base copy with respect to a first testing variable. The testing service executes the application program within the first modified version of the normal operating environment to test the application program in response to at least one of the users selecting the first modified version.

The system and method of the present invention provide a number of important technical advantages. Unlike prior techniques for testing application programs, the system and method of the present invention allows multiple users to concurrently access the shared resources of the testing service and the shared database using a user-friendly user interface. Each user may select a particular application program to be tested and may select a particular modified version of the normal operating environment in which to test the selected application program, regardless of the simultaneous testing activities of other users. The system and method of the present invention isolate the modified versions of the normal operating environment, in which the application programs are tested, from the normal operating environment to prevent testing from modifying or otherwise undesirably affecting the normal testing environment. In addition, the system and method of the present invention allow users to relatively easily generate new testing configurations and new modified versions of the normal operating environment, providing an important technical advantage over previous techniques for testing application programs. Other important technical advantages are readily apparent to those skilled in the art from the following figures, description, and claims.

BRIEF DESCRIPTION OF THE DRAWINGS

For a complete understanding of the present invention and for further features and advantages thereof, reference is now made to the following description taken in conjunction with the accompanying drawings, in which.

DETAILED DESCRIPTION OF THE INVENTION

Figure 1:
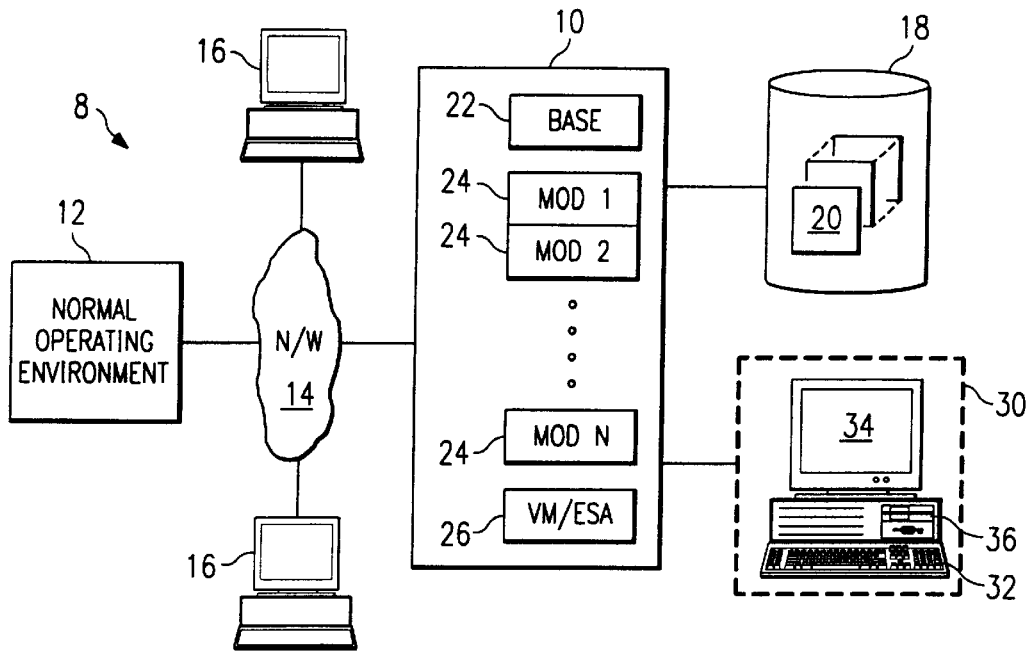
FIG. 1 illustrates an exemplary system for testing an application program.

FIG. 1 illustrates exemplary system 8 for testing an application program. In general, system 8 allows multiple users 16 to concurrently test a variety of application programs 20 within a variety of operating environments that are isolated from network 14 and the normal operating environments 12 for application programs 20, such that testing of application programs 20 does not modify or otherwise undesirably affect normal operating environments 12. As discussed more fully below, testing service 10 provides a user interface through which multiple concurrent users 16 may select particular operating environments and particular application programs 20 for testing, conduct the testing, and record the testing results without the time and associated costs associated with previous techniques for testing application programs. Furthermore, testing service 10 allows existing operating environments to be easily modified for testing purposes and allows new operating environments to be easily generated for testing purposes, providing an important technical advantage. The features and operation of system 8 and testing service 10 are discussed more fully below.

System 8 includes one or more normal operating environments 12 that each include the hardware, software, and operating conditions on which application programs 20 to be tested using system 8 would normally operate if the application programs 20 were not being tested using system 8. As an example, normal operating environment 12 for a particular application program 20 might include a hardware platform such as an IBM mainframe computer, a software operating system such as OS/390, and appropriate operating conditions, such as the operating system date, suitable to define normal operating environment 12. For purposes of this discussion, the operating system date is the date that an operating system within a given operating environment returns to application programs executing on the operating system when the application programs request the current date. Each application program 20 may have a single or multiple normal operating environments 12, and different application programs 20 may have different normal operating environments 12. Although a single normal operating environment 12 is discussed, references to the singular are meant to encompass the plural where appropriate.

Application programs 20 may be any suitable computer programs or portion thereof. In a particular embodiment, application programs 20 are business application programs that act upon or using dates expressed in a format having a two-digit calendar year and for which conversion to a format having a four-digit calendar year is performed, internal or external to the application program, due to potential ambiguities associated with dates on and after Jan. 1, 2000. For example, application program 20 may be an inventory application program that recommends an action based on the age of an inventoried item, a banking application program that calculates interest according to one or more dates, a health care application program that determines the availability of coverage based on one or more dates, or any other suitable application program 20. System 8 may be used to test any application program 20, regardless of the application to which application program 20 is directed when executing within normal operating environment 12.

Normal operating environment 12 is coupled to one or more users 16 and testing service 10 using network (N/W) 14. Network 14 may be a local area network (LAN), a metropolitan area network (MAN), a wide area network (WAN), a global communications network such as the Internet, or any other network suitable to support data communications between normal operating environment 12, users 16, and testing service 10. Although network 14 is discussed in the singular, normal operating environment 12, users 16, and testing service 10 may communicate using multiple networks 14. Normal operating environment 12, users 16, and testing service 10 may communicate over network 14 using any suitable communications protocol. Users 16 may communicate with testing service 10 using a different network 14 and a different protocol than testing service 10 uses to communicate with normal operating environment 12. For example, in one particular embodiment, users 16 communicate with testing service 10 using Transmission Control Protocol/Internet Protocol (TCP/IP) and testing service 10 communicates with normal operating environment 12 using File Transfer Protocol (FTP).

Application programs 20 to be tested using system 8 are stored in shared database 18 prior to testing. One or more users 16, a system administrator, or another suitable person or device may store application programs 20 in shared database 18. In one embodiment, shared database 18 includes one or more direct access storage devices that are each concurrently accessible to testing service 10 and to multiple users 16 that select application programs 20 for testing using the user interface that testing service 10 provides to users 16. Shared database 18 may include one or more suitable storage devices at each of one or more locations integral to or separate from testing service 10. Users 16 may be autonomous or operated by one or more persons or devices.

Testing service 10 includes Virtual Machine/Enterprise Systems Architecture (VM/ESA) or another suitable operating system 26 providing guest support capabilities allowing one or more other operating systems, for example, and not by way of limitation, OS/390, Multiple Virtual Storage (MVS), Virtual Storage Extended (VSE), and VM/ESA itself, to run concurrently on operating system 26 as programs that share access to shared database 18 and application programs 20 stored in shared database 18. In general, VM/ESA simulates to users 16 the existence of dedicated machines, including processors, storage devices, input/output (I/O) devices, and other suitable components, as virtual machines on which the guest operating systems and application programs 20 may execute for purposes of testing application programs 20. Although VM/ESA is discussed herein, the present invention contemplates any operating system 26 suitable to support the features, operation, and shared resources of testing service 10 described herein.

Testing service 10 and operating system 26 support one or more testing configurations that each include a base copy (BASE) 22 of normal operating environment 12 that is essentially identical to normal operating environment 12 from the perspective of users 16 and application programs 12. In one embodiment, a separate, although identical, base copy 22 is associated with each testing configuration. Base copy 22 for each testing configuration is generated prior to testing in response to input from users 16, a system administrator, or another suitable person or device. Each base copy 22 has an associated network address that is known to operating system 26 and is suitable to allow base copy 22 and normal operating environment 12 to communicate using operating system 26 and network 14. In addition to base copy 22, each testing configuration includes one or more modified versions (MOD 1, MOD 2, ... MOD N) 24 of normal operating environment 12. In one embodiment, base copy 22 for each testing configuration may be modified as appropriate to generate some or all modified versions 24 for the testing configuration, minimizing the incremental cost of generating modified versions 24.

Unlike base copies 22, which are logically connected to normal operating environment 12 using operating system 26 and network 14, modified versions 24 remain isolated from network 14 and normal operating environment 12 to ensure that the testing of application programs 20 using modified versions 24 does not modify or otherwise undesirably affect normal operating environment 12. In one embodiment, since modified versions 24 do not have access to network 14 and normal operating environment 12, user 16 must access appropriate base copy 22 to perform functions requiring a connection to network 14, for example, to communicate testing results to users 16, normal operating environment 12, or any other physical or logical location associated with network 14. In addition to reducing or eliminating the effects of testing on normal operating environment 12, isolating modified versions 24 from network 14 eliminates the need to configure network addresses for modified versions 24, providing an important technical advantage.

For each testing configuration, modified versions 24 differ from normal operating environment 12 and base copy 22 with respect to a single common testing variable. This allows affects of the testing variable on the execution of application program 20 to be more accurately determined than if multiple aspects of normal operating environment 12 were varied simultaneously. The testing variable may vary for each testing configuration or may be the same for two or more testing configurations. For example, the testing variable for a first testing configuration might be the operating system date, such that base copy 22 and each modified version 24 have different operating system dates. In this case, all aspects of normal operating environment 12 other than the operating system date would be identical in base copy 22 and all modified versions 24. This first testing configuration might allow multiple concurrent users 16 to test multiple application programs 20 with respect to multiple operating system dates that occur on and after Jan. 1, 2000.

Continuing the example, the testing variable for a second testing configuration might be the operating system or operating system version, such that base copy 22 and each modified version 24 will include different operating systems or different operating system versions. In this case, all aspects of normal operating environment 12 other than the operating system or operating system version would be identical in base copy 22 and all modified versions 24. This second testing configuration might allow multiple concurrent users 16 to test multiple application programs 20 with respect to multiple operating systems or operating system versions, with the operating system date remaining constant.

In one embodiment, testing service 10 allows multiple concurrent users 16 to easily select a particular testing configuration, select base copy 22 or a particular modified version 24 for the particular testing configuration, and select a particular application program 20 to be tested, all using a graphical user interface (GUI) or other user interface that provides these selections in the form of a text menu, an icon palette, or in any other suitable manner. The present invention contemplates testing service 10 providing a separate menu selection for each possible combination of modified version 24 and application program 20, although this is less preferable due to the time and cost that would be required. The selection of testing configurations, testing environments of modified versions 24, and application programs 20 using the user interface of testing service 10 is discussed more fully below with reference to FIGS. 2a and 2b.

Testing service 10 also allows multiple concurrent users 16 to duplicate and modify a testing configuration relatively easily, in a manner analogous to copying and editing a file, such that users 16 may generate new testing configurations according to particular needs without the time and costs that would otherwise be required. For example, a particular user 16 might duplicate the first testing configuration discussed above, the operating system date being the testing variable for the first testing configuration, to generate a second testing configuration. After modifying the second testing configuration such that the testing variable for the second configuration is the operating system or operating system version rather than the operating system date, user 16 may test application programs 20 using base copy 22 or modified versions 24 of the second testing configuration. As a result, testing service 10 provides increased testing capability while reducing the incremental time and costs associated with generating new testing environments.

Testing service 10 may operate on one or more computers 30 that are integral to or separate from hardware and software that support normal operating environment 12, users 16, or shared database 18. Computer 30 may include an input device 32, such as a keypad, touch screen, microphone, or other device to accept information. An output device 34 may convey information associated with the operation of testing service 10, including digital or analog data, visual information, or audio information. Input device 32 and output device 34 may include fixed or removable storage media, such as magnetic computer disks, CD-ROM, or other suitable media to both receive output from and provide input to testing service 10. Computer 30 may include a processor 36 and volatile or non-volatile memory to execute instructions and manipulate information according to the operation of testing service 10.

In operation of system 8, base copy 22 and one or more modified versions 24 of normal operating environment 12 for at least one testing configuration are generated in any suitable manner. One or more application programs 20 to be tested using testing service 10 are stored in shared database 18. One or more users 16 access testing service 10 in any suitable manner, for example, after providing a login ID and a password, and are given an opportunity to select base copy 22 or a particular modified version 24 associated with the testing configuration for testing a selected application program 20. If more than one testing configuration has been generated, each of the users 16 selects a particular modified version 24 for a particular selected testing configuration. As discussed above, since all users 16 have concurrent access to all testing configurations, modified versions 24, and application programs 20 for purposes of testing application programs 20, multiple users 16 may concurrently select the same testing configuration, modified version 24, or application program 20, in any combination.

After user 16 selects the testing configuration, the particular associated modified version 24, and a particular application program 20, testing service 10 executes the selected application program 20 within the environment of selected modified version 24. Testing service 10 records the testing results for user 16 and, in response to input from user 16, automatically, or in any other suitable manner, communicates the testing results to one or more users 16, to normal operating environment 12, or to any other appropriate physical or logical location. Since modified versions 24 are not connected to network 14, user 16 must access base copy 22 for the testing configuration if testing results are to be communicated through network 14. Once a test has been completed, user 16 is given an opportunity to perform additional testing with respect to the same or different testing configurations, modified versions 24, and application programs 20. Testing service 10 may be used in connection with integration testing, certification testing, regression testing, singly or in any combination, separately or concurrently.

Figure 2:
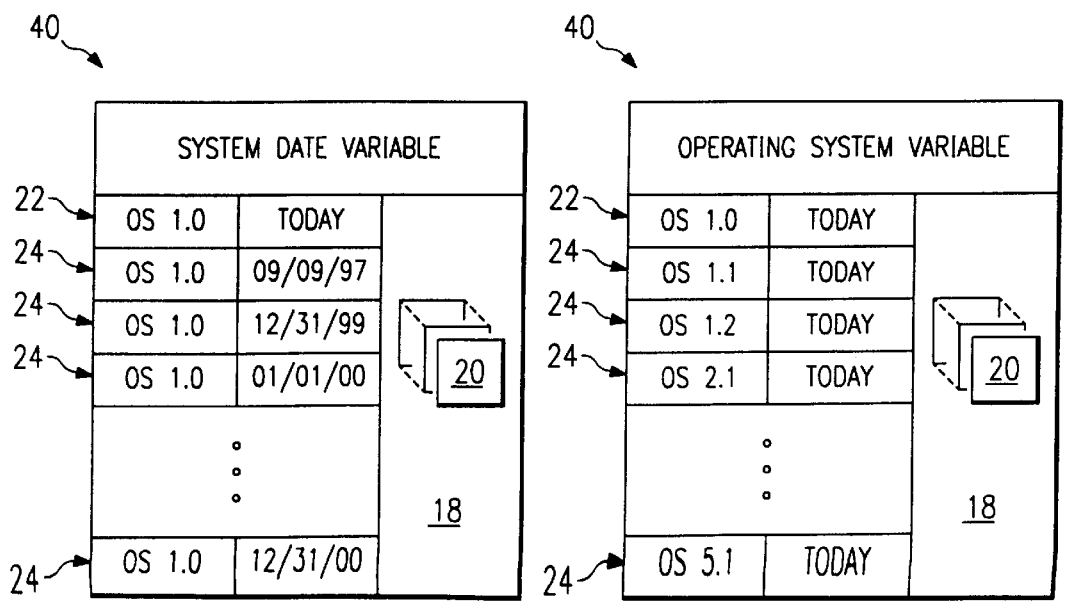
FIGS. 2a and 2b each illustrate an exemplary testing configuration.

FIGS. 2a and 2b each illustrate an exemplary testing configuration 40 that testing service 10 might support in accordance with the present invention. In the example of FIG. 2a, first testing configuration 40 has the operating system date as its common testing variable, as shown in the middle column of FIG. 2a. All other aspects of base copy 22 and thus normal operating environment 12, for example, the operating system and operating system version, are identical for base copy 22 and all modified versions 24, as illustrated in the left column of FIG. 2a. In the example shown in FIG. 2b, second testing configuration 40 has the operating system version as its common testing variable, as shown in the left column of FIG. 2b. All other aspects of base copy 22 and thus normal operating environment 12, for example, the operating system date, are identical for base copy 22 and all modified versions 24, as shown in the middle column of FIG. 2b. Although operating system date and operating system version are discussed, the present invention contemplates using any suitable testing variable for a particular testing configuration 40.

All application programs 20 stored in shared database 18 are fully accessible to multiple concurrent users 16 for testing with respect to any modified version 24 of first and second testing configurations 40. In one embodiment, testing service 10 presents first and second testing configurations 40 to multiple concurrent users 16 using a GUI or other suitable user interface that allows each user 16 to point and click using a mouse or other pointer, enter a number or other identifier using a keypad, or otherwise select base copy 22 or a particular modified version 24 for either first or second testing configuration 40. In one embodiment, base copy 22 is selected only for functions that require a connection to network 14, for example, communicating testing results to users 16 or to normal operating environment 12. A particular modified version 24 is selected only for purposes of testing an application program 20, which user 16 selects from among possibly multiple application programs 20 stored in shared database 18 using the user interface of testing service 10.

In response to these selections, which completely specify the nature and scope of testing to be performed, testing service 10 executes selected application program 20 on, within, or otherwise in association with the selected modified version 24 and records the testing results. User 16 may then select base copy 22 to access network 14 for communicating the testing results to one or more users 16 or normal operating environment 12. In one embodiment, as discussed above, second testing configuration 40 of FIG. 2b may be relatively easily generated by modifying first testing configuration 40 of FIG. 2a and subsequently modifying duplicated first testing configuration 40, for example, and not by way of limitation: (1) by modifying the operating system dates such that the operating system dates are identical for base copy 22 and all modified versions 24, and (2) by modifying the operating system versions such that the operating system versions are different for base copy 22 and all modified versions 24. Users 16, a system administrator, or any other person or device may generate and modify testing configurations 40 as often as necessary for particular needs.

Figure 3:
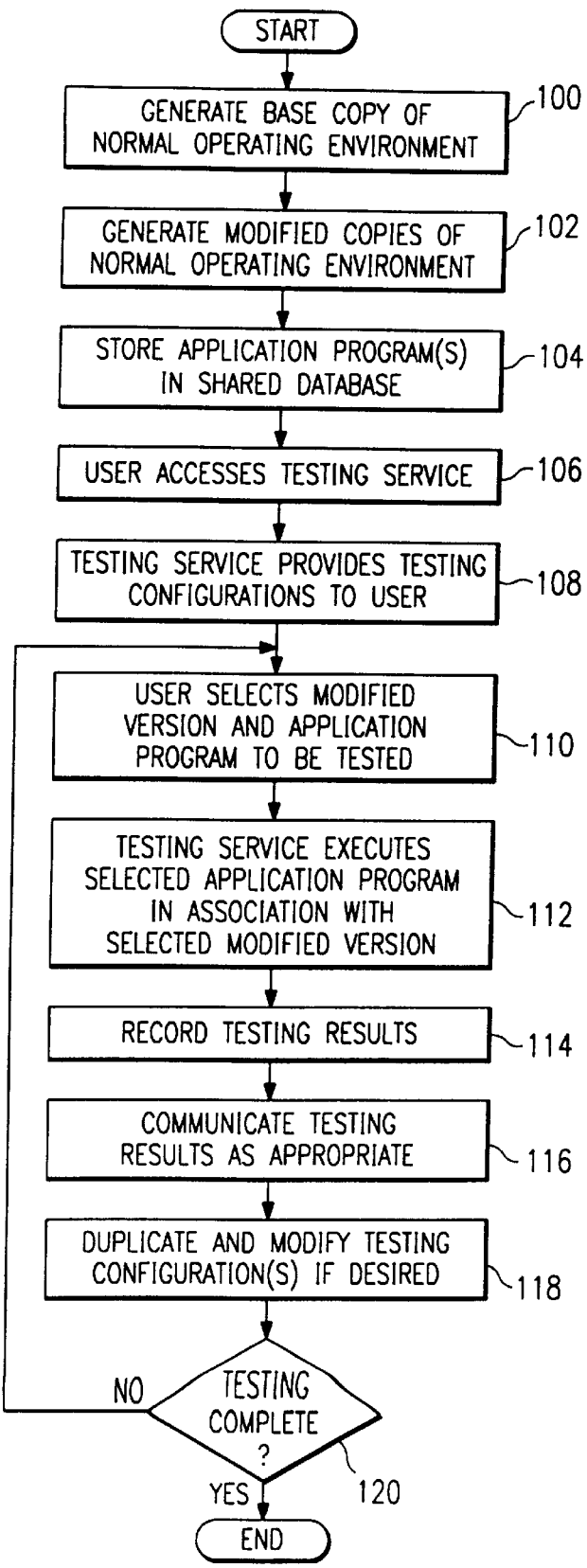
FIG. 3 is a flowchart illustrating an exemplary method of testing an application program.

FIG. 3 illustrates an exemplary method of testing an application program 20 using system 8 and testing service 10. The method begins at step 100, where base copy 22 of normal operating environment 12 is generated. The present invention contemplates generating multiple base copies 22 of a single normal operating environment 12 and generating base copy 22 for each of possibly multiple normal operating environments 12, with each base copy 22 being part of a different testing configuration 40 in both of these cases. At step 102, one or more modified versions 24 of normal operating environment 12 are generated using corresponding base copy 22 or in any other suitable manner. For example, in one embodiment, base copy 22 may be duplicated and then modified to generate appropriate modified versions 24. In addition, a modified version 24 may be duplicated and then modified to generate another modified version 24. Base copy 22 and modified versions 24 for one or more each testing configurations 40 may be generated in any suitable manner. At step 104, users 16, a system administrator, or any other suitable person or device stores application programs 20 to be tested in shared database 18.

As discussed above each user 16 has concurrent access to the shared resources of testing service 10 and shared database 18 for purposes of testing application programs 20 stored in shared database 18. User 16 accesses testing service 10 at step 106, possibly after providing a login ID and password, and is presented with one or more testing configurations 40 at step 108, together with the associated base copies 22 and modified versions 24 of normal operating environment 12. At step 110, user 16 selects a particular modified version 24 and a particular application program 20 to be tested on, within, or otherwise is association with modified version 24. Since multiple users 16 have shared concurrent access to the resources of testing service 10 and shared database 18, multiple users 16 may select the same modified version 24 and application program 20 for purposes of testing application program 20. Users 16 may be made aware of and follow the selections and testing activities of other users 16, or the activities of one or more users 16 may be transparent to all other users 16. In one embodiment, the ability to provide multiple concurrent access to the shared resources of testing service 10 is an important feature of operating system 26.

After the testing environment has been completely specified through the selections made at step 110, testing service 10 executes the selected application program 20 on, within, or otherwise in association with selected modified version 24 at step 112 and records the testing results for the test at step 114. At step 10, testing service 116 communicates the testing results as appropriate. In one embodiment, if the testing results must be communicated using network 14, user 16 must first access base copy 22 using the user interface of testing service 10, because modified version 24 is isolated from network 14 and normal operating environment 12. At step 118, user 16 may duplicate and modify one or more existing testing configurations 40 to generate one or more new testing configurations 40. In one embodiment, as discussed above, generating new testing configurations in this manner is analogous to copying and editing a file and may usually be performed in a similar amount of time. If testing is not complete at step 120, the method returns to step 110, where user 16 may again make testing selections using testing service 10, else the method ends.

Although the present invention has been described with several embodiments, a plethora of changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A system for testing an application program, comprising:

a normal operating environment for the application program within which the application program is intended to execute when not being tested;

a shared database operable to store the application program and to provide a plurality of users with access to the application program; and a testing service coupled to the normal operating environment and the shared database, the testing service supporting a base copy of the normal operating environment that simulates the normal operating environment and is coupled to the normal operating environment, the testing service supporting a first modified version of the normal operating environment that is isolated from the normal operating environment, the first modified version differing from the base copy with respect to a first testing variable, the testing service operable to execute the application program within the first modified version of the normal operating environment to test the application program in response to at least one of the users selecting the first modified version.

2. The system of claim 1, wherein the testing service supports a second modified version of the normal operating environment that differs from the base copy and from the first modified version with respect to the first testing variable.

3. The system of claim 1, wherein the testing service supports a second modified version of the normal operating environment that differs from the base copy with respect to a second testing variable.

4. The system of claim 1, wherein the testing service is coupled to at least one of the users, the user selecting the application program to be tested from among a plurality of application programs stored in the shared database.

5. The system of claim 1, wherein the testing service is coupled to at least one of the users and supports a plurality of modified versions of the normal operating environment that each differ from the base copy with respect to the first testing variable, the user selecting the first modified version, within which the application program is to be tested, from among the plurality of modified versions.

6. The system of claim 1, wherein the first testing variable is an operating system date.

7. The system of claim 1, wherein the base copy, the first modified version, and the first testing variable are associated with a first testing configuration, the testing service operable to generate a second testing configuration identical to the first testing configuration, the testing service further operable to allow the modification of the second testing configuration.

8. A testing service for testing an application program, comprising:
    an operating system operable to support a virtual machine on which at least one guest operating system may execute, the operating system further operable to provide a plurality of users with access to a shared database in which the application program is stored;
    a base copy simulating a normal operating environment for the application program within which the application program is intended to execute when the application program is not being tested, the base copy coupled to the normal operating environment; and
    a first modified version of the normal operating environment that is isolated from the normal operating environment, the first modified version differing from the base copy with respect to a first testing variable, the testing service operable to execute the application program within the first modified version of the normal operating environment to test the application program in response to at least one of the users selecting the first modified version.

9. The service of claim 8, further comprising a second modified version of the normal operating environment that differs from the base copy and from the first modified version with respect to the first testing variable.

10. The service of claim 8, wherein the testing service supports a second modified version of the normal operating environment that differs from the base copy with respect to a second testing variable.

11. The service of claim 8, wherein the testing service is coupled to at least one of the users, the user selecting the application program to be tested from among a plurality of application programs stored in the shared database.

12. The service of claim 8, wherein the testing service is coupled to at least one of the users and supports a plurality of modified versions of the normal operating environment that each differ from the base copy with respect to the first testing variable, the user selecting the first modified version, within which the application program is to be tested, from among the plurality of modified versions.

13. The service of claim 8, wherein the base copy, the first modified version, and the first testing variable are associated with a first testing configuration, the testing service operable to duplicate the first testing configuration to generate a second testing configuration, the testing service further operable to allow modification of the second testing configuration.

14. A method of testing an application program, comprising:
    storing the application program in a shared database operable to provide a plurality of users with access to the application program;
    generating a base copy simulating a normal operating environment for the application program within which the application program is intended to execute when not being tested, the base copy being coupled to the normal operating environment;
    generating a first modified version of the normal operating environment that is isolated from the normal operating environment, the first modified version differing from the base copy with respect to a first testing variable;
    at least one of the users selecting the first modified version of the normal operating environment; and
    executing the application program within the first modified version of the normal operating environment to test the application program.

15. The method of claim 14, further comprising the step of generating a second modified version of the normal operating environment that differs from the base copy and from the first modified version with respect to the first testing variable.

16. The method of claim 14, further comprising the step of generating a second modified version of the normal operating environment that differs from the base copy and from the first modified version with respect to a second testing variable.

17. The method of claim 14, further comprising the step of selecting the application program to be tested from among the plurality of application programs stored in the shared database.

18. The method of claim 14, further comprising the steps of:
    generating a plurality of modified versions of the normal operating environment that each differ from the base copy with respect to the first testing variable; and
    selecting the first modified version of the normal operating environment, within which the application program is to be tested, from among the plurality of modified versions.

19. The method of claim 14, wherein the first testing variable is an operating system date.

20. The method of claim 14, wherein the base copy, the first modified version, and the first testing variable are associated with a first testing configuration, and further comprising the steps of:
    generating a second testing configuration identical the first testing configuration; and
    modifying the second testing configuration.

* * * * *